United States Patent
Arampongpun et al.

(10) Patent No.: US 8,802,173 B2
(45) Date of Patent: Aug. 12, 2014

(54) PROCESS FOR COATING FROZEN PRODUCTS

(75) Inventors: Narun Arampongpun, Bangkok (TH); Anthony George Bird, Old Northampton (GB); Paul Edward Cheney, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 103 days.

(21) Appl. No.: 12/897,086

(22) Filed: Oct. 4, 2010

(65) Prior Publication Data

US 2011/0086144 A1    Apr. 14, 2011

(30) Foreign Application Priority Data

Oct. 9, 2009 (EP) ..................................... 09172630

(51) Int. Cl.
*A23G 9/00* (2006.01)
*A23G 9/14* (2006.01)
*A23G 9/26* (2006.01)
*A23G 9/24* (2006.01)

(52) U.S. Cl.
CPC .... *A23G 9/26* (2013.01); *A23G 9/24* (2013.01)
USPC ............................ 426/302; 426/307; 426/306

(58) Field of Classification Search
CPC ............. A23G 9/26; A23G 9/28; A23G 9/48; A23G 1/34; A23G 3/20
USPC ........................... 426/101, 282, 302, 206, 307
See application file for complete search history.

(56) References Cited

U.S. PATENT DOCUMENTS

| 2,106,893 | A | * | 2/1938 | Krein ............................ 426/282 |
| 3,228,357 | A | * | 1/1966 | Bruschke et al. ............. 426/293 |
| 3,632,356 | A | | 1/1972 | Silverstein et al. |
| 3,648,625 | A | | 3/1972 | Glass |
| 3,839,987 | A | | 10/1974 | Bruschke et al. |
| 4,189,289 | A | | 2/1980 | Getman |
| 4,193,373 | A | | 3/1980 | Hanson, Jr. et al. |
| 4,473,027 | A | | 9/1984 | Arfert et al. |

(Continued)

FOREIGN PATENT DOCUMENTS

| EP | 0 848 910 A2 | 6/1998 |
| EP | 848910 A2 | 6/1998 |

(Continued)

OTHER PUBLICATIONS

European Search Report Application No. EP 09172630 completed May 19, 2010.

(Continued)

*Primary Examiner* — Jyoti Chawla
(74) *Attorney, Agent, or Firm* — Gerard J. McGowan, Jr.

(57) ABSTRACT

A process for coating frozen confection stick products (20) is provided, the process comprising providing a chamber (2) having two open ends (3,4), two sides (5,6) and a base (7); providing at least one pair of apertures (10A-10D), wherein one aperture of each pair is located on each side of the chamber, and wherein the apertures are vertical slots; supplying a liquid coating material to each aperture thereby forming curtains of the liquid coating material (14A-14D); and conveying the frozen confection (20) through the chamber with the stick uppermost so that the frozen confection passes through the curtains of coating material. An apparatus for operating the process is also provided.

11 Claims, 2 Drawing Sheets

(56) References Cited

U.S. PATENT DOCUMENTS

| | | | |
|---|---|---|---|
| 5,004,620 A | 4/1991 | Straight et al. | |
| 6,251,455 B1 | 6/2001 | Thomas | |
| 6,251,456 B1 | 6/2001 | Maul et al. | |
| 6,689,406 B2 * | 2/2004 | Kuehl et al. | 426/303 |
| 2002/0090437 A1 | 7/2002 | Brown et al. | |
| 2004/0163586 A1 | 8/2004 | Sanders et al. | |
| 2009/0130265 A1 | 5/2009 | Leas | |

FOREIGN PATENT DOCUMENTS

| | | |
|---|---|---|
| GB | 1128776 | 10/1968 |
| GB | 2 012 543 A | 8/1979 |
| GB | 2 159 383 A | 12/1985 |
| WO | WO 99/37163 | 7/1999 |
| WO | WO 00/13524 | 3/2000 |
| WO | WO 02/45521 A2 | 6/2002 |
| WO | WO 2004/017748 A2 | 3/2004 |

OTHER PUBLICATIONS

European Search Report Application No. EP 10175974 completed Feb. 21, 2011

EA Search Report dated Jan. 21, 2011.

* cited by examiner

PROCESS FOR COATING FROZEN PRODUCTS

TECHNICAL FIELD OF THE INVENTION

The present invention relates to a process for coating frozen confection products. In particular it relates to a process for coating shaped ice cream stick products with coatings such as chocolate.

BACKGROUND TO THE INVENTION

Frozen confections which consist of ice cream, frozen yoghurt, water ice or the like coated with chocolate, frozen fruit juice, or other coatings are popular products. These products are often supported on a stick so that they can be conveniently consumed without being held directly, thus avoiding the consumer's fingers becoming covered with the coating. Chocolate-coated stick products are one example of this type of product that has been known for many years.

Ice cream products on sticks are often produced by an "extrude and cut" process. In recent years, there has been an increasing demand for frozen confectionery products that are shaped in 3 dimensions. Such products can be produced for example by moulding or by the process described in WO 04/17748 using rollers. The ice cream is then dipped into molten chocolate at about 45° C. for a certain time to form the coating. The most commonly used method of dipping, on an industrial scale, is to hold products upside down by their sticks on an indexing conveyor. The conveyor moves the products, stepwise, toward a dipping bath. When over the bath, the products are pushed down in to the chocolate, pulled back up and then indexed away by the conveyor. To achieve the required production speed, the conveyor must be able to accelerate and decelerate very quickly. Therefore, it must have very powerful drives and a heavy sturdy frame to achieve the accelerations and withstand the forces associated with high speed operation. These requirements result in a very expensive and complex machine. In a simpler and cheaper dipping method, the ice cream products are continuously moved though the bath. The products are initially held upside down by their sticks. They are then rotated into a horizontal position in order to clear the side of the bath. They are then rotated back to the upside down (vertical) position, thereby dipping the ice cream into the chocolate while the products are moved along the length of the bath. At the end of the bath they are rotated back to the horizontal position to clear the edge of the tank. Finally they are rotated back to the upside down position to allow the coating to set and the excess chocolate to run-off. However, this method also has disadvantages: the velocity at which the product must pass through the bath can cause the ice cream to be ripped off of the stick, especially if the ice cream has not been completely hardened. Also, this method requires a relatively large dipping tank containing a large volume of chocolate. This increases waste because the chocolate remaining in the tank must be disposed of after a production run.

As an alternative to dipping, spraying can be used to coat stick products. However, it is difficult to achieve complete, uniform coverage and the process can be messy and wasteful. U.S. Pat. No. 4,189,289 discloses a method for producing frozen confections which are sprayed with chocolate. Chopped nuts or cake pieces are then embedded in the chocolate coating. In the spraying process, the ice cream product is held upside down by its stick and chocolate is sprayed through a number of small holes, both from the sides and from beneath, in order to coat the whole product. Spraying has the disadvantage that it produces a matt, rather than glossy, coating.

Enrobing is widely used to coat bar products without sticks. The product is placed on a mesh conveyor belt and passed through a waterfall of chocolate (known as a curtain) typically formed by pumping liquid chocolate through an aperture in the form of a horizontal slot. This operation coats the top, front, back and sides of the bar. An air knife may be used to blow off the excess coating, which drains through the mesh conveyor. Finally, the mesh conveyor carries the product into a shallow bath of chocolate thereby immersing the bottom of the product and coating it. Enrobing is not normally used for stick products because the sticks would also be covered in chocolate. U.S. Pat. No. 4,473,027 describes a process of enrobing stick products while preventing the sticks from being covered in the coating by means of dams in the waterfall which are aligned with the sticks. However, this method requires that the sticks are precisely aligned with the dams. Moreover, it is only suitable for products with at least one flat side and cannot be used to coat 3D objects without affecting their shape.

Therefore there remains a need for an improved process for coating frozen confection products which does not suffer from these disadvantages. In particular, there is a need for a process which can coat shaped ice cream stick products.

BRIEF DESCRIPTION OF THE INVENTION

We have now devised a method which overcomes the problems associated with previous coating methods. Accordingly, in a first aspect, the present invention provides a process for coating frozen confection stick products, the process comprising:

providing a chamber having two open ends, two sides and a base;

providing at least one pair of apertures wherein one aperture of each pair is located on each side of the chamber, and wherein the apertures are vertical slots;

supplying a liquid coating material to each aperture thereby forming curtains of the liquid coating material; and conveying the frozen confection through the chamber with the stick uppermost so that the frozen confection passes through the curtains of coating material.

Preferably the coating is a fat-based coating. In one embodiment the fat-based coating is chocolate. The fat-based coating may consist essentially of vegetable oil and sugar, and optionally colours and/or flavours.

Alternatively, the coating is a water ice, fruit juice or fruit puree.

Preferably the apertures are vertical slots which are from 0.5 to 5 mm in width, more preferably from 1 to 3 mm.

Preferably there are four apertures arranged in two pairs.

Preferably the curtains are directed at an angle of from 45 to 85°, more preferably from 60 to 80°, such as about 70° to the sides of the chamber.

Preferably the cross-sectional area of the product is at least 30% of the cross-sectional area of the chamber when viewed along the direction of motion of the product.

Preferably a reservoir of the coating material is formed in the lower part of the chamber. More preferably as the product enters the chamber the product displaces the liquid coating material in the curtains and the reservoir so that the coating material envelops the product.

In a second aspect, the present invention provides an apparatus for coating frozen confection stick products, the apparatus comprising:

- a chamber having two open ends, two sides and a base;
- a stick-holder for conveying the products through the chamber whilst holding them with the stick uppermost;
- at least one pair of apertures wherein one aperture of each pair is located on each side of the chamber;
- supply means for supplying a liquid coating material to each of the apertures. (The supply means may also be referred to as a coating material supplier).

BRIEF DESCRIPTION OF THE DRAWINGS

The present invention will be further described with reference to the Figures wherein.

DETAILED DESCRIPTION OF THE INVENTION

Unless defined otherwise, all technical and scientific terms used herein have the same meaning as commonly understood by one of ordinary skill in the art (e.g. in frozen food manufacture). Definitions and descriptions of various terms and techniques used in frozen confectionery manufacture are found in "Ice Cream", $6^{th}$ Edition R. T. Marshall, H. D. Goff and R. W. Hartel, Kluwer Academic/Plenum Publishers, New York 2003.

Frozen confection means a confection made by freezing a pasteurised mix of ingredients such as water, fat, sweetener, protein (normally milk proteins), and optionally other ingredients such as emulsifiers, stabilisers, colours and flavours. Frozen confections may be aerated. Frozen confections include ice cream, water ice, frozen yoghurt and the like.

Coating means any edible material which can be used to form a coating layer on a frozen confection. Coatings may be fat-based, such as chocolate (dark chocolate, white chocolate, milk chocolate). The term "chocolate" is not intended to be limited to compositions that can legally be described as chocolate in any particular country but includes any products having the general character of chocolate. It therefore includes chocolate-like materials which are made using fats other than cocoa butter (for example coconut oil). Chocolate usually contains non-fat cocoa solids, but it is not essential that it does so (e.g. white chocolate). A fat-based coating may consist essentially of vegetable oil and sugar, together with colours and/or flavours as required. The coating may also be water-based, such as water ices, fruit juices and fruit purees.

Coatings are applied to the frozen confection as liquids, but solidify when they are cooled down, for example as a result of contact with the frozen confection. Chocolates have complex solidification behaviour because they contain mixtures of different triglycerides which can crystallize in different forms. For example, cocoa butter can exist in six different crystalline forms (polymorphs). As chocolate solidifies, triglycerides begin to crystallize. Within a few seconds the chocolate becomes dry to the touch and has plastic or leathery texture. Crystallization continues slowly, so that it typically takes several hours or days for the triglycerides to fully crystallize and so that the chocolate reaches its maximum brittleness. Chocolate made from fats other than cocoa butter displays similar behaviour, but typically crystallizes over a narrower temperature range and reaches maximum brittleness more quickly.

Figure 1:
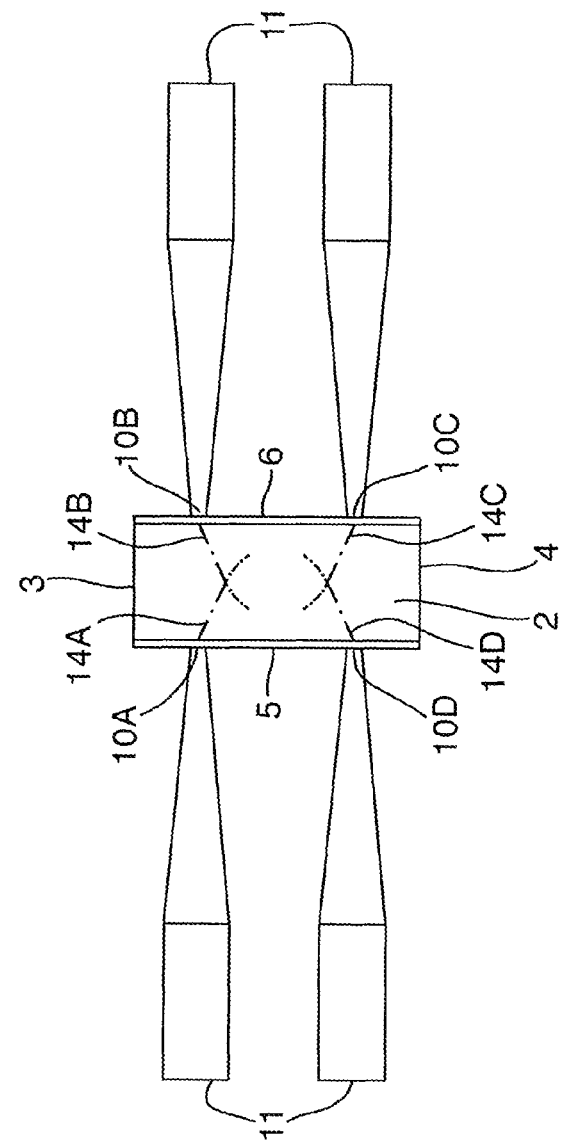
FIG. 1 shows a view of an apparatus according to the invention from above.

FIG. 1 shows a view of an apparatus according to the invention from above. The apparatus's comprises a chamber 2 having two open ends 3, 4, two sides 5, 6 and a base 7 (not shown in this view). The apparatus has four apertures 10A, 10B, 10C, 10D arranged in two pairs 10A, 10B and 10C, 10D. Each pair consists of two apertures located opposite each other, one on each side of the chamber. Liquid coating is held in a tank (not shown). Typically the tank is heated, so that the coating is maintained at the desired temperature, i.e. it has the correct viscosity for pumping and enrobing. For example, if the coating is chocolate the tank is typically at a temperature of around 45° C. The liquid coating is pumped from the tank to each aperture through pipes 11, typically at a pressure of about 2-3 bar.

Figure 2A:
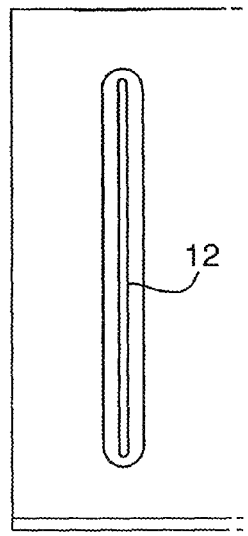
FIG. 2 shows two types of aperture.
Figure 2B:
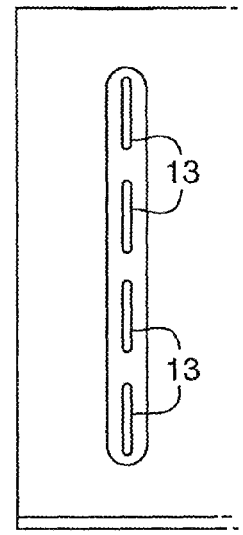
Figure 3:
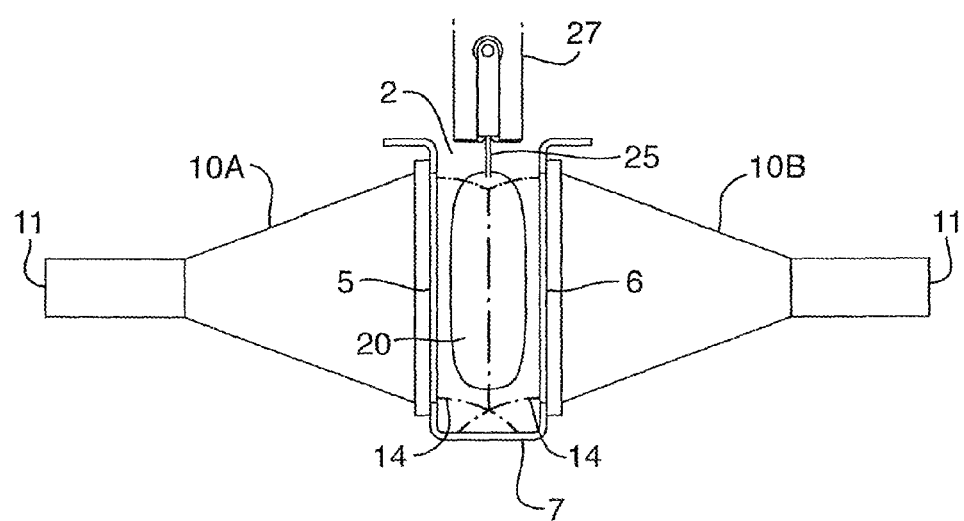
FIG. 3 shows a view of the apparatus from one end.

As shown in FIG. 2(a), the apertures are substantially vertical slots 12, typically from 0.5 to 5 mm in width, more preferably from 1 to 3 mm, such as about 2 mm. The slots do not need to be exactly vertical, but are suitably inclined at no more than about 30° from the vertical, preferably less than 15°. As shown in FIG. 3, the length of the slot is approximately the same as the length of the product, within about +/−20%. The apertures are therefore different from nozzles which are used to spray coating materials and which are typically circular holes of less than 1 mm in diameter. By pumping the liquid coating through such apertures two pairs of curtains 14A, 14B and 14C, 14D are formed, shown in FIG. 1. The term "curtain" means a continuously flowing waterfall of liquid coating material. It therefore does not include a spray of coating material. Generally, the more viscous the coating material, the wider the aperture required. The aperture may be a single slot as in FIG. 2(a), or a number of smaller adjoining slots 13, as in FIG. 2(b).

As shown in FIG. 1, the apertures are preferably directed generally towards the centre of the chamber so that the curtains are not perpendicular to the sides, but angled inwards. Preferably the curtains are at an angle of from 50 to 85°, more preferably from 60 to 80°, such as about 70° to the sides of the chamber (which are parallel to the direction along which the products are conveyed through the chamber). Each pair of curtains meets at or close to the central axis of the chamber. The frozen confection 20, which may be produced by well-known processes such as moulding, forming or "extrude and cut", is conveyed through the chamber by a stick holder which holds it in a substantially vertical orientation with the stick uppermost. Preferably, the frozen confection is edge-on so that the largest faces of the product are approximately perpendicular to the curtains. The four curtains do not meet at a single point. In fact the two pairs of curtains 14A, 14B and 14C, 14D are spaced apart by a distance which is approximately the width of the frozen confection product 20 (i.e. the size of the product in the dimension parallel to the direction of motion through the chamber). Thus when the confection is located in the chamber, its front edge 21 is coated by one pair of curtains 14C, 14D at the same time as the rear edge 22 is coated by the other pair of curtains and 14A, 14B. We have found that using two pairs of apertures to form curtains that are angled towards the centre of the chamber results in improved coating of the frozen confections, especially if they are shaped in three dimensions. Angling the two pairs of curtains inwards directs the coating onto the front and rear edges 21, 22 of the product. This results in better coverage of 3D features such as grooves and protrusions. It also has the advantage that the coating is directed inside the chamber, reducing the risk of it being projected out of the apparatus.

Although the embodiment shown in FIG. 1 has two pairs of apertures (and hence two curtains), it is also possible to have a single pair of apertures, or more than two pairs, or indeed an odd number of apertures (although a single curtain will give poor coverage of one side of the product). A single pair of apertures is adequate for coating products that have essentially flat front and back edges; in this case, there is little need for the curtains to be angled, i.e. they can simply be perpendicular to the sides of the chamber.

FIG. 3 shows a view of the apparatus from one end. The chamber 2 is generally U-shaped with vertical sides 5, 6 and a horizontal base 7. Frozen confection products 20 are held upside down by their sticks 25 by a stick-holder 27, i.e. the products are generally vertical with the stick uppermost. The products are typically 70-100 mm high×30-60 mm wide×15-35 mm thick (before coating), although this is not essential. The products may be of any shape and size and may have rounded corners and/or edges.

The products are conveyed into the chamber, preferably edge on, i.e. with their largest faces parallel to the sides 5, 6 of the chamber. The chamber must be larger than the product so that the product can pass through it; however, it is preferred that the chamber is not substantially larger than the product because (for reasons that will be explained below) the larger the chamber, the greater is the amount and flow rate of coating material required. The product therefore occupies a substantial part of the internal volume of the chamber. For example, there is typically a gap of about 10-15 mm between the edge of the product and the wall of the chamber. So for example, the chamber is typically 40-50 mm wide and 90-120 mm high, depending on the size of the product. Thus the cross-sectional area of the product (viewed along the direction of motion of the product) is preferably at least 30% of the cross-sectional area of the chamber, more preferably at least 40%, most preferably at least 50%. The chamber suitably has a length approximately twice the width of the product. When two (or more) pairs of apertures used, the apertures are arranged so that the points of intersection of the pairs of curtains are spaced apart by approximately the width of the product, e.g. 50 mm. The dimensions of the chamber, the positions of the apertures and the size of the apertures can be chosen according to the size of the products.

The coating material from the curtains reaches the bottom of the chamber where it meets the base. The presence of the base (rather than simply having the bottom of the chamber open above a collecting tank) allows a reservoir of the coating material to form in the lower part of the chamber. The products are held so that the uppermost part is somewhat above the level of the top of the curtains 14. The stick-holder conveys the products into the chamber and through the curtains of coating material. The product occupies a substantial proportion of the volume of the chamber. Thus, as it enters the chamber, the product displaces the liquid coating material within the chamber. The coating flows up and coats the upper surface of the product around the stick, thereby enveloping the product. This ensures that the ends of the product (i.e. the parts which are uppermost and lowermost when held upside down by the stick), and any 3D features such as recesses or protrusions are completely coated, thereby producing a uniformly coated product. Thus in fact, the process has many similarities to dipping, in that the whole product is enveloped with the coating, but without the disadvantages of dipping mentioned above. The excess coating flows out of one or both ends of the chamber and is returned to the tank, preferably via a series of baffles in order to prevent aeration.

The flow rate of the coating is adjusted so that the chamber is essentially full of coating material when the product is inside. This results in good coating. If the flow rate is too high, then the coating can cover the stick and/or overflow out of the top of the chamber. On the other hand, if the flow rate is too low, there is insufficient coating material inside the chamber to get a good coating, especially at the uppermost part of the product.

The velocity of the product passing through the tunnel is adjusted to ensure good coating: if it is too high, the product does not spend enough time in contact with the curtain and thus the coating layer formed may be too thin and/or incomplete. Conversely, if the velocity is too slow, the coating may become too thick. A coating thickness of about 1-3 mm is preferred. For high speed production, the number of apertures and hence curtains can be increased, which allows the products to be moved very quickly through the chamber whilst ensuring good coating.

Adjusting the rheological properties (e.g. viscosity and yield stress) of the liquid coating material also affects the thickness of the coating: the more viscous the liquid, the thicker the layer of coating formed. The viscosity can be changed by altering the temperature of the liquid and/or by adjusting the formulation. For example, if the coating is a fat-based material such as chocolate, increasing the amount of fat in the coating material generally reduces the viscosity. If the coating is water-based, e.g. fruit puree, the viscosity can be changed for example by adjusting the amount of total solids or the amount of stabilisers present in the coating material. The rheological properties of the coating should be chosen so that good curtains are formed, as is known in conventional enrobing processes. For example, chocolates suitable for enrobing typically have a plastic viscosity of less than 10 Pa s, such as 0.1 to 1 Pa s. When the coating material has a very low viscosity, the width of the aperture should be reduced and/or the flow rate of the coating should be increased in order to form good curtains. If the coating is a water-ice, it may be partially frozen before coating in order to increase the viscosity. It is possible to have two or more different types of coating material, so that different coating materials are supplied to the apertures. This allows multiple layers of coatings or mixed coating layers to be produced.

This process and apparatus of the invention provides complete coverage of the stick products with the desired coating thickness and uniformity. It requires only a relatively small amount of coating material thereby minimising waste and is relatively low cost compared to a conventional dipping system.

The various features and embodiments of the present invention, referred to in individual sections above apply, as appropriate, to other sections, mutates mutandis. Consequently features specified in one section may be combined with features specified in other sections, as appropriate.

The invention claimed is:

1. A process for coating frozen confection stick products, the process comprising providing a chamber having two open ends, two sides and a base;
   providing at least one pair of apertures, wherein one aperture of each pair is located on each side of the chamber, and wherein the at least one pair of apertures are vertical slots which are from 0.5 to 5 mm in width;
   supplying a liquid coating material to each of the at least one pair of apertures thereby forming curtains of the liquid coating material wherein the curtains are at an angle of from 45 to 85° to the sides of the chamber; and
   conveying the frozen confection through the chamber with the stick uppermost so that the frozen confection passes through the curtains of coating material.

2. A process according to claim 1 wherein the coating is fat-based.

3. A process according to claim 2 wherein the coating is chocolate.

4. A process according to claim 2 wherein the coating consists essentially of vegetable oil and sugar, and optionally colors and/or flavors.

5. A process according to claim 1 wherein the coating is a water ice, fruit juice or fruit puree.

6. A process according to claim 1 wherein the slots are from 1 to 3 mm in width.

7. A process according to claim 1 wherein there are four apertures arranged in two pairs.

8. A process according to claim 1 wherein the cross-sectional area of the product is at least 30% of the cross-sectional area of the chamber when viewed along the direction of motion of the product.

9. A process according to claim 1 wherein a reservoir of the coating material is formed in the lower part of the chamber.

10. A process according to claim 9 wherein as the product enters the chamber, the product displaces the liquid coating material in the curtains and the reservoir so that the coating material envelops the product.

11. An apparatus for coating frozen confection stick products, the apparatus comprising
- a chamber having two open ends, two sides and a base;
- a stick-holder for conveying the products through the chamber whilst holding them with the stick uppermost;
- at least one pair of apertures, wherein one aperture of each pair is located on each side of the chamber and wherein the at least one pair of apertures are vertical slots which are from 0.5 to 5 mm in width; and
- a coating material supplier for supplying a liquid coating material to each of the apertures wherein the liquid coating material forms curtains directed at an angle of from 45 to 85° to the sides of the chamber.

* * * * *